United States Patent
Ardulov et al.

(10) Patent No.: US 11,386,300 B2
(45) Date of Patent: *Jul. 12, 2022

(54) ARTIFICIAL INTELLIGENCE ADVERSARIAL VULNERABILITY AUDIT TOOL

(71) Applicant: CALYPSO AI CORP, San Mateo, CA (US)

(72) Inventors: Victor Ardulov, Long Beach, CA (US); Neil Serebryany, Los Angeles, CA (US); Tyler Sweatt, Ashburn, VA (US); David Gibian, Brooklyn, NY (US)

(73) Assignee: CALYPSO AI CORP, San Mateo, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 17/063,554

(22) Filed: Oct. 5, 2020

(65) Prior Publication Data
US 2021/0397896 A1  Dec. 23, 2021

Related U.S. Application Data (63) Continuation of application No. 16/908,482, filed on Jun. 22, 2020, now Pat. No. 10,839,268.

(51) Int. Cl.
| | | |
|---|---|---|
| G06K 9/62 | (2022.01) |
| G06N 20/00 | (2019.01) |
| G06N 3/00 | (2006.01) |
| G06N 5/04 | (2006.01) |

(52) U.S. Cl.
CPC ......... *G06K 9/6262* (2013.01); *G06K 9/6267* (2013.01); *G06N 3/006* (2013.01); *G06N 5/04* (2013.01); *G06N 20/00* (2019.01)

(58) Field of Classification Search
CPC .... G06K 9/6262; G06K 9/6267; G06K 9/627; G06N 20/00; G06N 3/006; G06N 3/105; G06N 5/04; G06N 7/005; G06V 20/56
See application file for complete search history.

(56) References Cited

U.S. PATENT DOCUMENTS

| | | | | |
|---|---|---|---|---|
| 10,762,606 B2 * | 9/2020 | Tate | ...................... | G06T 5/001 |
| 2019/0035118 A1 * | 1/2019 | Zhao | ..................... | G06T 3/4046 |

* cited by examiner

*Primary Examiner* — Manuchehr Rahmjoo
(74) *Attorney, Agent, or Firm* — Cooley LLP (57) ABSTRACT

An image with a known, first classification by the machine learning model is received. This image is then iteratively modified using at least one perturbation algorithm and such modified images are input into the machine learning model until such time as the machine learning model outputs a second classification different from the first classification. Data characterizing the modifications to the image that resulted in the second classification can be provided (e.g., displayed in a GUI, loaded into memory, stored in physical persistence, transmitted to a remote computing device). Related apparatus, systems, techniques and articles are also described.

14 Claims, 11 Drawing Sheets

ARTIFICIAL INTELLIGENCE ADVERSARIAL VULNERABILITY AUDIT TOOL

RELATED APPLICATION

The current application is a continuation of U.S. patent application Ser. No. 16/908,482 filed on Jun. 22, 2020, the contents of which are hereby fully incorporated by reference.

TECHNICAL FIELD

The subject matter described herein relates to an adversarial machine learning vulnerability audit tool which can be used for diverse artificial intelligence applications including computer vision-based machine learning.

BACKGROUND

Adversarial machine learning (AML) is critical to autonomous systems for a number of reasons, not the least being that it provides a structured and repeatable method for understanding risks of the autonomous system reacting poorly to new situations or being tricked/manipulated by either malicious actors or environmental conditions. As autonomous systems are increasingly sought after in national security applications (high risk) such as weapons systems and daily (medium risk) such as autonomous vehicles (self-driving cars) situations, opportunities for nefarious actors or adversaries to compromise their integrity will continue to increase exponentially. Therefore, the creation of automated testing capabilities for both physical and digital adversarial samples represents a critical step forward in the ability for both public trust to be developed in autonomous systems as well as in the ability for regulatory bodies to test and enforce safety standards associated with these systems.

Examples of autonomous and semi-autonomous systems being deployed include autonomous drones, autonomous vehicles (self-driving cars), and autonomous weapons systems. Numerous approaches have been employed to compromise the integrity of these systems including certain paints to confuse object detection and recognition, t-shirts that confuse facial and object recognition, and geometric stickers on road signs (an example of the underlying ability to trick an autonomous system using physical world inputs, called a physical to a digital attack).

SUMMARY

In a first aspect, an image with a known, first classification by the machine learning model is received. This image is then iteratively modified using at least one perturbation algorithm and such modified images are input into the machine learning model until such time as the machine learning model outputs a second classification different from the first classification. Data characterizing the modifications to the image that resulted in the second classification can be provided (e.g., displayed in a GUI, loaded into memory, stored in physical persistence, transmitted to a remote computing device).

The data characterizing the modification explains how the modifying caused the machine learning to change its classification from the first classification to the second classification.

The at least one perturbation algorithm forming part of the iterative modifying can use various techniques to determine how to modify the image including one or more of: gradient-based optimization, reinforcement learning, random selection, pattern matching, an Apriori algorithm, to determine how to modify the image.

The iterative modifying of the image can simulate an attack on the machine learning model. These simulated attacks can take various forms including a change in an environmental condition of a sensor obtaining the image, a change in a position of a sensor obtaining the image, and/or a modification of a physical object. With the latter, in some variations, a physical overlay (e.g., an adhesive print, sticker, specific clothing patterns, etc.) can be printed which can be affixed to or positioned in relation to the physical object.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced and automated techniques for identifying vulnerabilities within machine learning models.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

When adversarial samples are introduced, either maliciously or accidentally in the real world, AML as provided herein offers organizations the ability to understand the fundamental security limitations of their systems prior to deployment into real-world scenarios and offers breakthrough opportunities for artificial intelligence (AI)/machine learning (ML) explainability, validation, and security. The current subject matter is directed to an AI adversarial vulnerability audit tool (AIAVA) that analyzes computer vision-based machine learning systems and automates the creation of inputs that are misclassified by the system but remain undetectable to human observers. The automated ability to produce such 'adversarial inputs' is a critical component of testing autonomous systems, including self-driving vehicles and weapons systems, that use computer vision as a core component of their decision-making process.

The AIAVA tool as provided herein is designed to create and optimize both physically (e.g. stickers or specially designed clothing) and digitally (e.g. changes in the underlying pixels of an image) delivered adversarial inputs into computer vision systems. AIAVA first analyzes and understands a machine learning-enabled, computer vision model's vulnerability to an adversarial input across different model access types ranging from complete access to the model to so-called blackbox attacks where a would-be attacker only has access to an endpoint. Uniquely, AIAVA's capabilities allow for the creation and optimization of physical as well as digital adversarial sample development.

ADVERSARIAL EXAMPLES

In the context of machine learning (ML) an adversarial input is one that would make the model fail according to its performance metrics. AIAVA can allow end-users to interrogate their models and identify how they misbehave under a number of adversarial scenarios. These scenarios can be based on a true adversary or malicious actor or can be environmentally created, such as a camera being placed at a wrong angle or a tree branch partially covering a stop sign.

The AIAVA tool can comprise an attack library (see 810 in FIG. 8) consisting of, for example, data sufficient to generate four families of attacks: "Brute Force" (BF), "Black box" (BB), "Grey Box" (GB), and "White Box" (WB). An attack in the case of AML refers to an algorithmically altered data inputs that are designed to trick, or otherwise manipulate, the autonomous system into performing an action not intended by the system creator, such as misclassifying an image. Each family of attack can capture the assumptions of a setting under which an adversary might stress the system. Respectively, each attack can assume more access to data and model parameters enabling an adversary to utilize more and more sophisticated attacks. These attacks can be launched on a model with a requisite sample of test data and then used to evaluate the model's performance in each setting. The performance can be evaluated under the same metrics as the original model ("Clean" setting). Furthermore, the AIAVA tool compares the model's performance over the strength of the attacks by measuring the size of perturbations that ultimately lead to the models' failures.

Further, the AIAVA tool can include an explainability engine that enables the user to explore instances in which the model fails, highlighting features that the model used to produce its output. In the context of AIAVA, the explainability engine is used to evaluate how perturbations are impacting the decision-making process of the model, so that users can better understand their options to overcome these vulnerabilities.

A visual attack engine can then be utilized to generate and produce adversarial patches which can be translated into physical objects and "stickers" that are designed to "break" machine learning models. By further applying constraints to the attack optimization algorithm AIAVA can help identify physically manifesting adversarial examples that can be used by towards purposes such as avoiding object detection or breaking object classification models.

Figure 1:
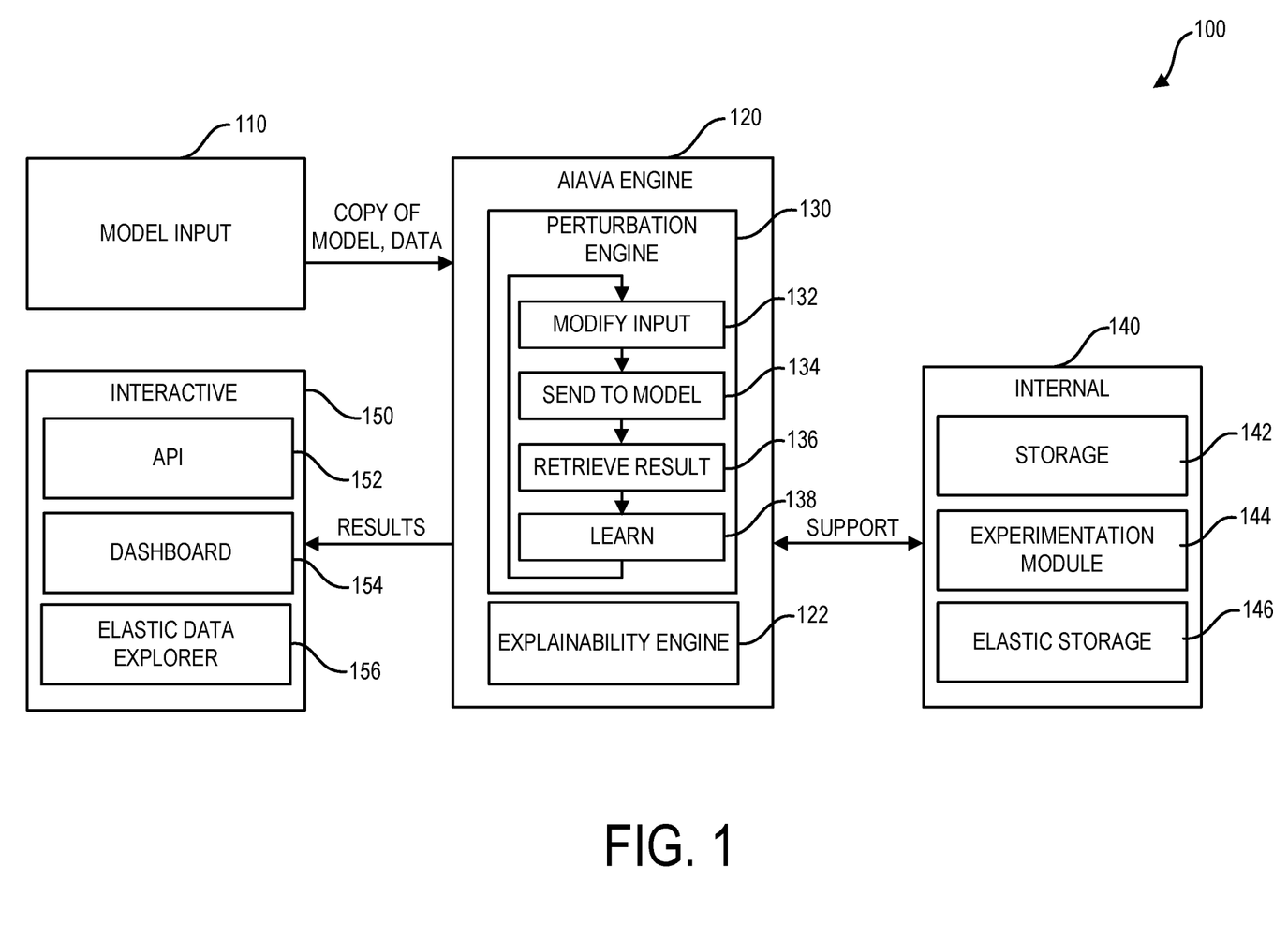
FIG. 1 is a system diagram illustrating an example architecture for an artificial intelligence adversarial vulnerability audit (AIAVA) tool.

The AIAVA tool is a programmatic tool for the creation and optimization of adversarial samples for machine learning-enabled computer vision systems. FIG. 1 is a diagram 100 providing an example architecture for the AIAVA tool and can comprise three main components: an interactive part 150 providing front end components by which a user interacts (e.g., graphical user interface, etc.), and internal part 140 which comprises general system architecture components and an AIAVA engine 120 which comprises a perturbation engine 130 and includes or otherwise accesses proprietary attack libraries.

The interactive part 150 is the part of the AIAVA tool that is directly accessible to the user. The interactive part 150 comprises interfaces (e.g., GUIs, etc.) that can allow the user to provide all the required inputs, including the model 110 (discussed in detail below), the data, and the configuration, as well as obtain and review all the produced outputs (mainly the test results). The outputs can be consumed through user-friendly dashboards 154 (which can be configured to meet each client's operational needs), or they can be consumed programmatically through an API 152 such as a RESTful API. A data explorer 156 can allow the user to explore various sources of data including, for example, data stored in the cloud (e.g., elastic cloud storage facilities, etc.)

The internal part 140 of the AIAVA tool comprises components such as storage 142 which can be cloud-based or otherwise segregated and configured to store malware samples/artifacts, other elastic storage 146 to house various experimentation data and algorithms, and an experimentation module 144 which can be used to provide algorithmic experimentation to constantly find and improve the AIAVA engine 120.

The AIAVA engine 120 receives, as an input, a user selected model, 110 performs user selected actions (such as adversarial testing, explainability analysis), and return the data back to the interactive part of the product for the user to review. The AIAVA engine 120 comprises two main parts, namely an explainability engine 122 and a perturbation engine 130. Further details regarding the engine can be found in co-pending U.S. patent application Ser. No. 16/788,200, filed on Feb. 11, 2020, the contents of which are hereby fully incorporated by reference.

The explainability engine 122 is configured to provide the user as much insight into the "thinking" of their AI as possible. Recent advancements in AI algorithmic systems have become much more complex and more sophisticated. The tradeoff, however, that these systems had to suffer in return for increased complexity and sophistication is loss of transparency and explainability. The more sophisticated and powerful the AI—the more difficult it is for a human to interpret its decision-making.

In many industries, the explainability of AI systems is critical to their deployment and success. In industries such as aerospace, military and government, and autonomous vehicles, a mistake made by the AI can end up costing someone their life. Beyond the failure of the model, there are legal, compliance, and operational considerations which require that both technical and non-technical stakeholders understand a model and its activities. It is therefore paramount for the operator to understand the inner workings of their AI as much as possible.

Figure 2:
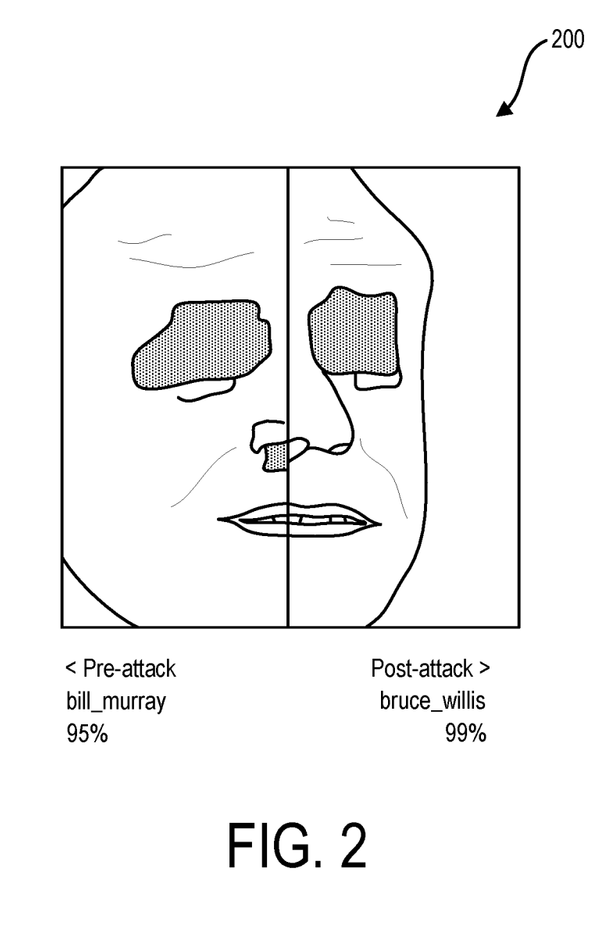
FIG. 2 is a diagram illustrating an adversarial machine learning attack on an image of a person.

The explainability library combines the latest research and techniques in and around explainability and packages them into an out-of-the-box module which selects the best-in-class explainability engine based on the input data type and autonomous system use case and proceeds to automatically generate metrics (statistical measures e.g. confusion matrix), data visualizations, diagrams, and graphics which allow a user to understand why an autonomous system made a decision. FIG. 2 is a diagram 200 illustrating how an attack can cause a facial recognition algorithm to misclassify an individual. In FIG. 2, alterations to an image of Bill Murray (either to a physical image or a digital image) can cause Mr. Murray to be misclassified as Bruce Willis. The explainability engine 122 can provide results back to the interactive part 150 which characterizes why the classification changed (e.g., obscuring the eyes of Bill Murray, etc.). For example, the explainability engine 122 can render a heat map on top of an image being classified that indicate the areas in which the image classifier was focused on before and after the image perturbation. Somewhat counter-intuitively, these heat maps do not show where the image was changed necessarily. Rather, they often point to the focus of the machine learning models during classification.

Figure 3:
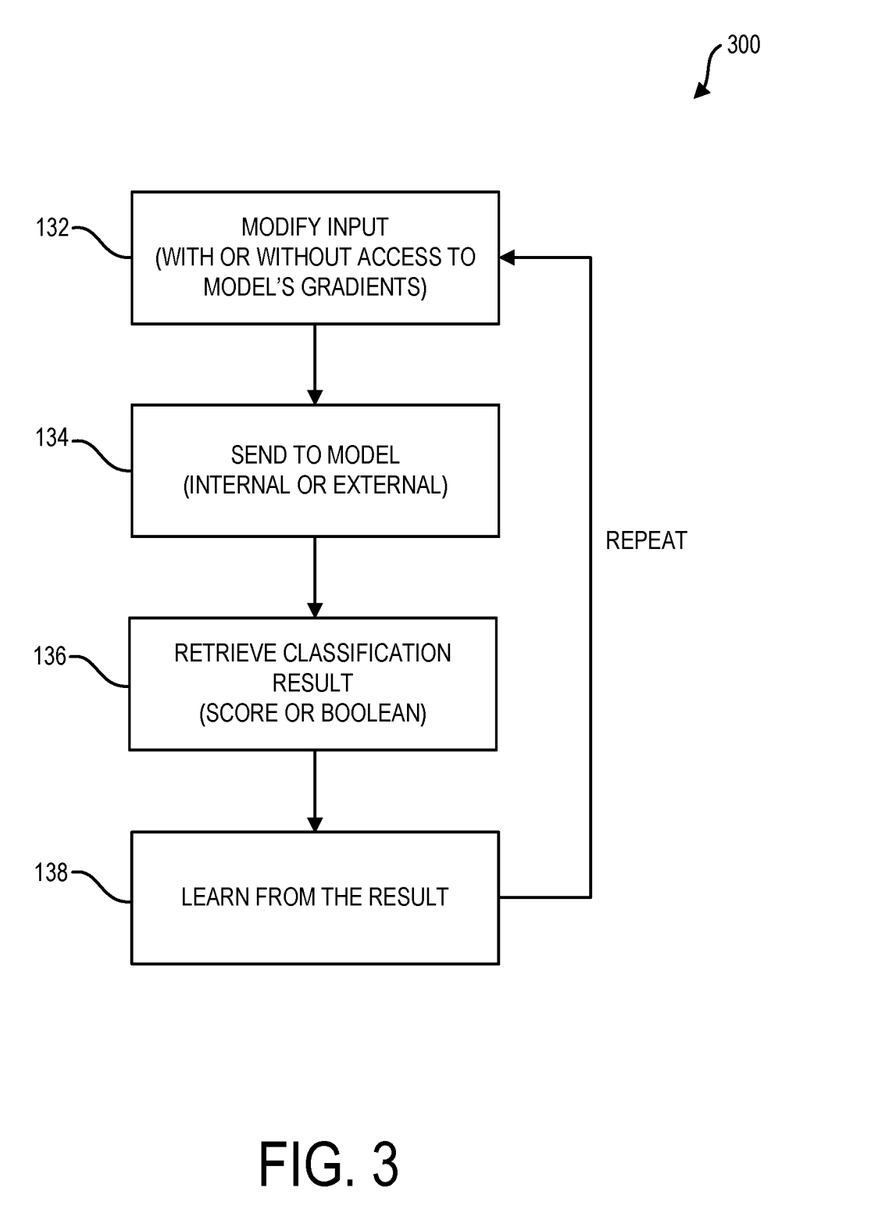
FIG. 3 is a diagram illustrating aspects of a perturbation engine forming part of an AIAVA tool.

The explainability engine 122 can be driven by the perturbation engine 130 in which an input to a model (e.g., an image) is modified 132, sent to a model being tested 134 such that a result is retrieved 136. An adversarial machine learning model can learn 138 from the results and iteratively modify the input 132 until a desired result is obtained (e.g., a misclassification, etc.). By stress testing the model under an extremely wide range of tests (i.e., modifications of the input 132), the AIAVA too is able to understand how, why, and in what contexts and the input model 110 will make decisions. This iterative process can be optimized for a specific test (creating an input that breaks a model) or can be aggregated across many tests for a more-complete understanding of the why behind model performance.

FIG. 3 is a diagram 300 providing further detail regarding the perturbation engine 130 which an ingest a model and, through an iterative process, find inputs that break or mislead the model. The modification of an input 132 can depend on the level of access to the underlying model given the AIAVA tool. As one example, the perturbation engine 130 can be given access to underlying model on varying levels of access including, for example:

Whitebox access—the AIAVA tool can see the results of classification (prediction score, Boolean), as well as the internals of the model (architecture, parameters, gradients).

Greybox access—the AIAVA tool can see the results of classification (prediction score, Boolean), but not the internals of the model.

Blackbox access—the AIAVA tool is only allowed to see the Boolean prediction label, but not the score.

No access—the AIAVA tool does not have access to both the model and its classification results.

Generally speaking, in each of the four levels of access, the AIAVA tool is able to successfully find evasive inputs that mislead the model. Naturally, however, the whitebox and greybox access levels allow the AIAVA tool to operate with much more power and sophistication the other access levels. In most cases, having access to model's prediction scores but not the model itself—is sufficient to break most modern AI systems, internal or external. Full whitebox access is beneficial when the user (likely the builder of the model) wants to test the worst possible scenario when the adversary has acquired full details of the inner workings of the model and hence is able to mount the most tailored and powerful type of attack.

Input modification at 132 can also depends on the datatype. Images are generally considered a simpler input compared to e.g. malware. Image modification in computer vision is typically bound by some distance metric, D.

$$D = \|x - \hat{x}\| < \in$$

where x is the original image and $\hat{x}$ is the perturbed input, and $\in$ is the bound of the distance. Some common examples from computer vision are L1 L2, and L-infinity norms, which look at different interpretations of differences in images:

$$L_\infty = \max_{i \in N} \max_{j \in M} p_{i,j} - \hat{p}_{i,j}$$

where N and M are the dimensions of the image and P is the pixel value of the image; such that an attack is only considered successful if an evasive sample is found within the limits of the distance metric. As soon as the metric is crossed without an evasive sample found—the attack is considered failed.

Figure 4:
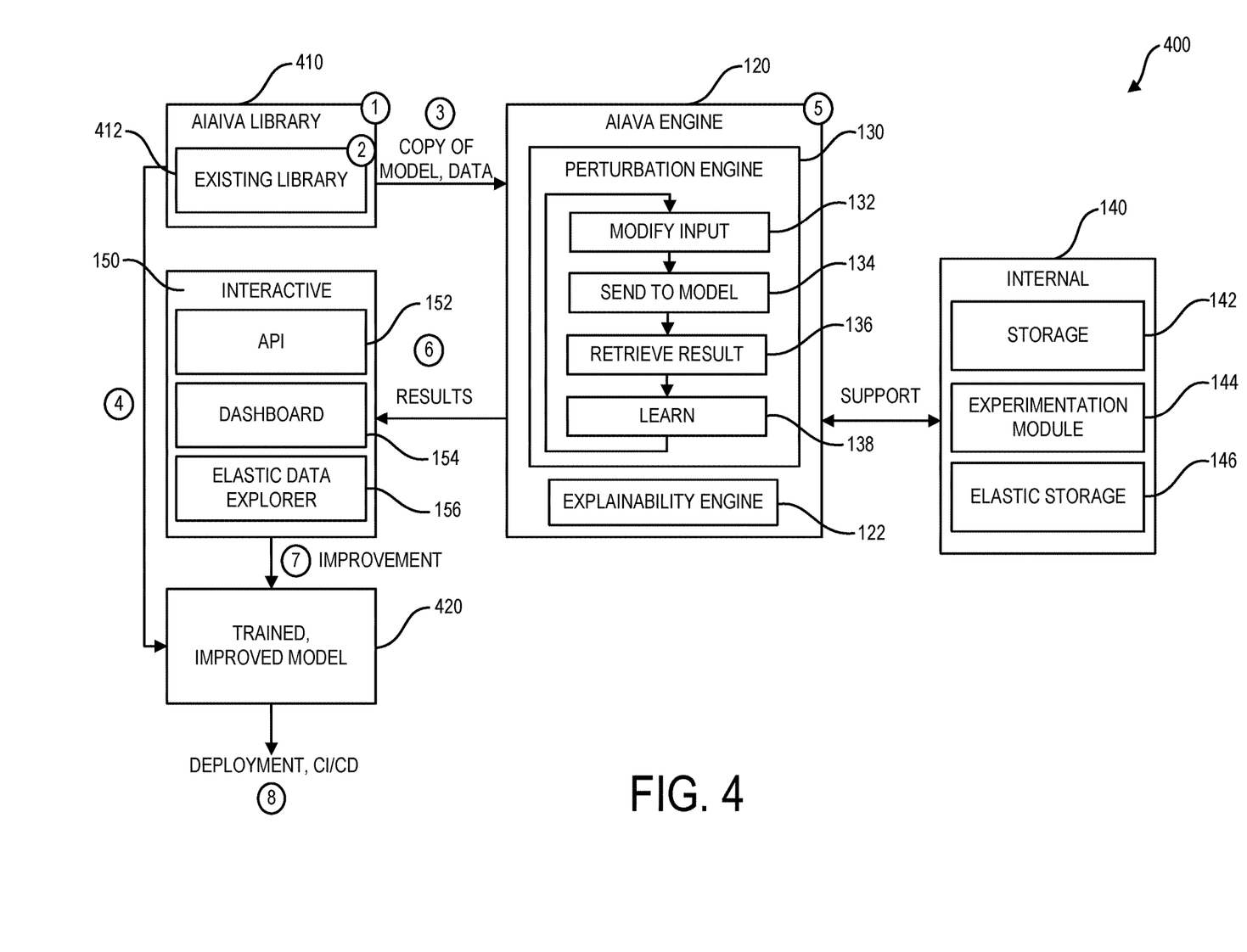
FIG. 4 is a diagram illustrating a first variation of the AIAVA tool of FIG. 1.

After the input is modified at 132, such modified input is sent to the model. Communication with the model, in this regard, can happen through an AIAVA library 410 or through an external connection (e.g., a vendor connection, etc.). This library can be a machine learning Python-based library that acts as a wrapper around existing third-party machine learning libraries, including TensorFlow, Keras, and PyTorch. The library can pass on features of the substrate library, however, augmenting it with additional functionality.

More specifically, the library can take a copy of the user's model and a part of their training data (this can be performed locally for security/privacy considerations)—and prepares them for ingestion by the AIAVA engine 120. This process can be designed to be as non-invasive as possible—the data scientist importing and using the library does not lose a single bit of functionality of the underlying, substrate library (e.g. TensorFlow) and does not have to learn any new commands. The library can also be used to prepare the model for adversarial and explainability testing—completely behind the scenes by taking a copy of the model and part of the training data and using these as targets for the attack.

If the model being tested has not been built by the user themselves and they do not have access to its parameters and architecture, testing can be performed at the greybox, blackbock, and no access levels. In such cases, a custom integration can be provided to ingest and consume the vendor's model. For example, a closed form equation or algorithm can be used to describe the model's learned decision function.

The manner in which the classification result is retrieved, at 136, is dependent on both the level of configured/available access and the model at hand. For example, if the user wants to run greybox level attacks against the model and the model is their own—no additional work is required and it is just a matter of configuring greybox in the configuration pane (need to reword this to be more generic—what is done?). With some models, the classification results (i.e., scores or predictions, etc.) might not be readily available and so connectors can be implemented to access such scores or predictions. In other variations when there is no access given to the AIAVA tool, prediction scores/Boolean and AIAVA, only limited types of attacks can be run against the model.

The perturbation engine 130 uses the classification result (132) to learn from the result 138 and ultimately generate a new input (which may be a modification of the most recent input to the model) to send the model. Learning (138) from the result can depend heavily on the selected datatype and level of access. Example ways that the AIAVA tool can learn from the classification result is by (1) using the parameters and architecture for the model, (2) using a reinforcement learning agent, and/or (3) randomly or pseudo-randomly.

Using the parameters of the model is an intuitive approach for data scientists involved in building machine learning models. Similar to how a loss function can be optimized to find the global minimum of the model when there is an attempt to try and fit a curve to the data, an adversarial attack can be designed as a saddle-point optimization problem, where the inner component is trying to minimize the distance function, while the outer component is trying to maximize a loss function.

$$\max_{\hat{x}} J = \max_{\hat{x}} \min_{D(x,\hat{x})} L(y, f_\theta(\hat{x}))$$

where L is the loss function, y is the ground truth label, $f_\theta$ is the parametric ML model, and D (x, x̂) is the distance function as described above.

One challenge with this approach is that it requires access to the model's parameters to calculate the gradients, and the algorithm treats the inputs as a continuous input. This means that this approach can be used with computer vision models tested in whitebox settings—but not for example malware detection models, where the input space is (often but not always) discrete.

Where model itself is not available, the AIAVA engine 120 can use a reinforcement learning (RL) agent to find an evasive sample. RL, as used herein, is a machine learning method that trains an agent to take actions in an environment so as to maximize a well-defined reward function. In this case, the environment is a feature representation of the input samples and the action space is the actions available in the perturbation engine 130. The agent is positively reinforced for finding actions that significantly reduce the file's classification score, indicating lost confidence in the true classification in favor of the adversarial action. For feature sets which are countably infinite (section names, imported function names, etc.), a feature reduction technique such as hashing can be used to collapse into them into a vector of fixed size.

The training process for the RL agent can comprise a number of rounds. Each round begins with a known input sample that has been correctly identified by the ML system. This sample is then modified through a series of mutations in the round. Each round training round can run for 100 turns, if the agent defeats the classifier early the round is ended. New rounds are run until the agent reaches a steady state, the number of required rounds required is not well defined but seems to be proportional to the ML model that the agent is exposed to. In practice, the RL agent can take anywhere from 10,000 to 1,000,000 rounds of training to find a local minimum.

Finally, if gradient-based optimization or reinforcement learning is not available to find evasive samples, simpler techniques can be adopted. A few examples include:

Random selection: this algorithm selects actions without considering the state of the file or previous actions, the action space has a flat probability distribution.

Learned probability: as with random selection the algorithm has no knowledge of state of the file or previous actions, however, in this algorithm the probability distribution is not flat across the action space is defined by the historic performance of different actions.

Pattern matching: here an Apriori algorithm is trained using results that have been the most successful in the past. The goal here is to find a set of common sequences of actions that tend to defeat a certain classifier and then apply these sequences to unseen samples. The algorithm mines frequent sequences for generating Boolean association rules. It uses an iterative level-wise search technique to discover (k+1) sequences from k sequences. First, the database is scanned to identify all the frequent 1-sequence by counting each of them and capturing those that satisfy the minimum support threshold. The identification of each frequent itemset requires scanning the entire database until no more frequent k-itemsets are discoverable. The database that is used for training this algorithm is derived from applying the random selection algorithm outlined above a dataset of over 50,000 input samples against a target classifier. Boolean association rules that are generated can then be deployed against this model for previously unseen input samples.

The following provides an example use case in which an internally developed model is tested and hardened automatically. A first example relates to a situation in which a data scientist who is constructing a model would like to have it tested before it goes into production. Such testing is particularly important if the model is being deployed in a safety- or security-sensitive context, and it is not sufficient to just test the model in a typical, non-adversarial environment. Continuing the example, the data scientist is building a model for facial recognition that will be deployed on security cameras to secure some facilities.

With reference to diagram 400 of FIG. 4, at 1, the data scientist can import an AIAVA library 410 at the beginning of their training script or software, in the file that initializes the training of an ML model. This can be done at the beginning so as to wrap, register, and monitor the training of the model from its inception. Subsequently, at 2, the data scientist causes their existing library 420 (e.g., TensorFlow) to be replaced with the AIAVA library 410. The AIAVA library 410 can act as a wrapper-library that preserves and passes on all the latest functionality of the existing library 420 (e.g., TensorFlow, etc.) as well as adding additional features. Then the model is trained, at 3, a copy of the model and a minimum required amount of training data (which can be stored locally, should privacy/security be an issue) is provided to the AIAVA engine 120. In addition, at 4, the workflow of training a model for the user need not change such that the user can still complete the training and proceed with their standard deployment routine for a trained, improved model 420.

The AIAVA engine 120, at 5, runs the model which includes adversarially attacking the model to find vulnerabilities and running the explainability engine 122 to provide the user with as much insight as possible into how their model makes decisions Thereafter, at 6, the results of testing by the engine are made available to the user either through the dashboard 150 or through the API 152.

The user can use the results of the AIAVA engine 120, at 7, to build or choose a better model. In addition, through the explainability engine 122, the user is able to "sense-check" the decision-making done by their model, to ensure it matches their expectations.

The suite of tests provided by the AIAVA engine 120 can be programmatically configured to run every time a model is trained and if needed included as part of an automatic CI/CD pipeline (so that such testing is done before deployment at 8). With this arrangement, a required minimum quality standard can be set that every model needs to pass before it is allowed into production.

Figure 5:
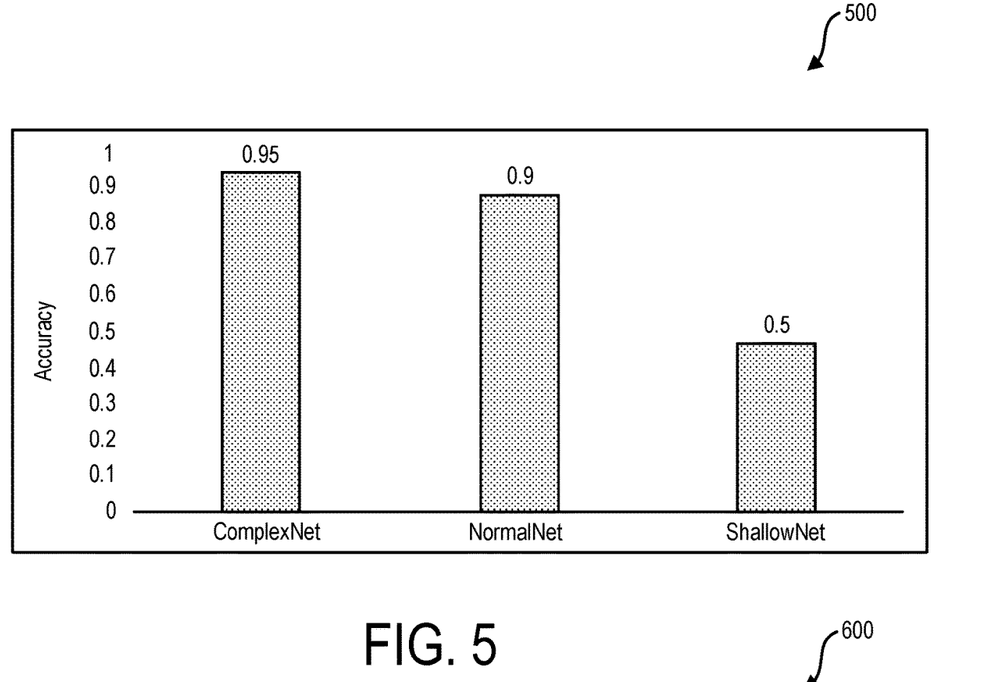
FIG. 5 is diagram illustrating a performance comparison of three machine learning models using a first assessment technique.

Normally, a data scientist would look at metrics like accuracy, F1 score, precision/recall and AUC to decide if the model is fit for purpose, and to choose the best one. They might, for example, produce an output such as provided in diagram 500 of FIG. 5. With this arrangement, based on this over-simplified analysis, the deployed model would be ComplexNet a neural network with a large and complicated architecture and many parameters. However, continuing the example, the data scientist remembers that she is working on a model that will be used in a security-sensitive context with potential adversaries present in the environment. See therefore uses the AIAVA engine 120 to conduct a battery of tests with three different distance settings: D1, D2, D3, of increasing power. The new output is provided in diagram 600 of FIG. 6.

Figure 6:
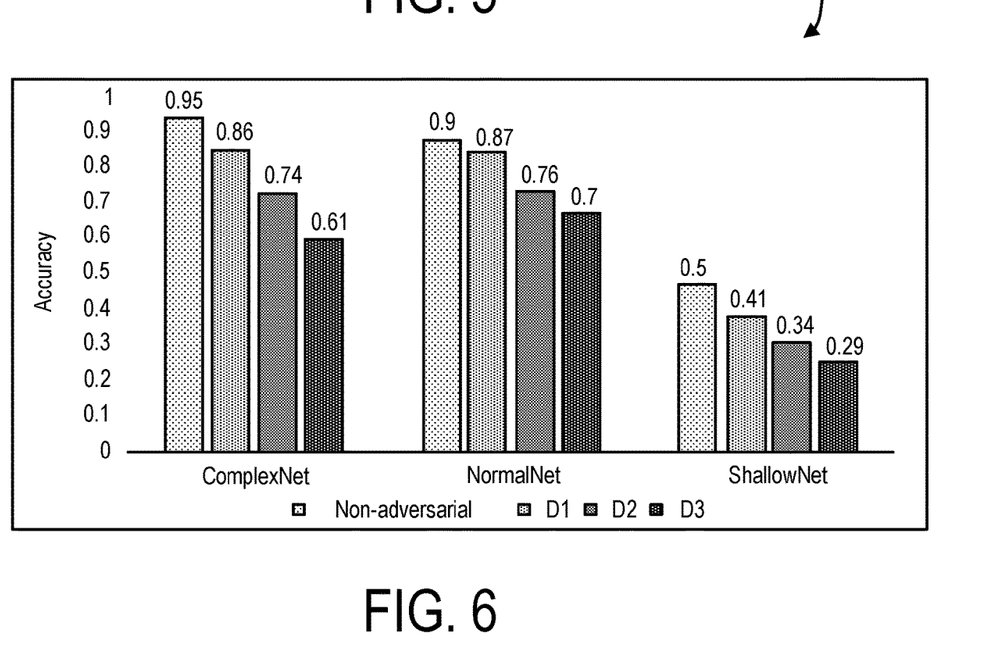
FIG. 6 is a diagram illustrating a performance comparison of three machine learning models using a second assessment technique.

The results of FIG. 6 while potentially being unexpected, can occur when deploying complex models. Many models, especially the more complicated neural networks, tend to fit the data slightly better because they are able to find and extract more complex features. The price that they pay for that is, however, that it is also easier to find small perturbations to inputs that throw them off. Simpler models, however, appear more resistant to adversarial attacks and, like in this case, may be preferable in security-sensitive contexts.

Figure 7:
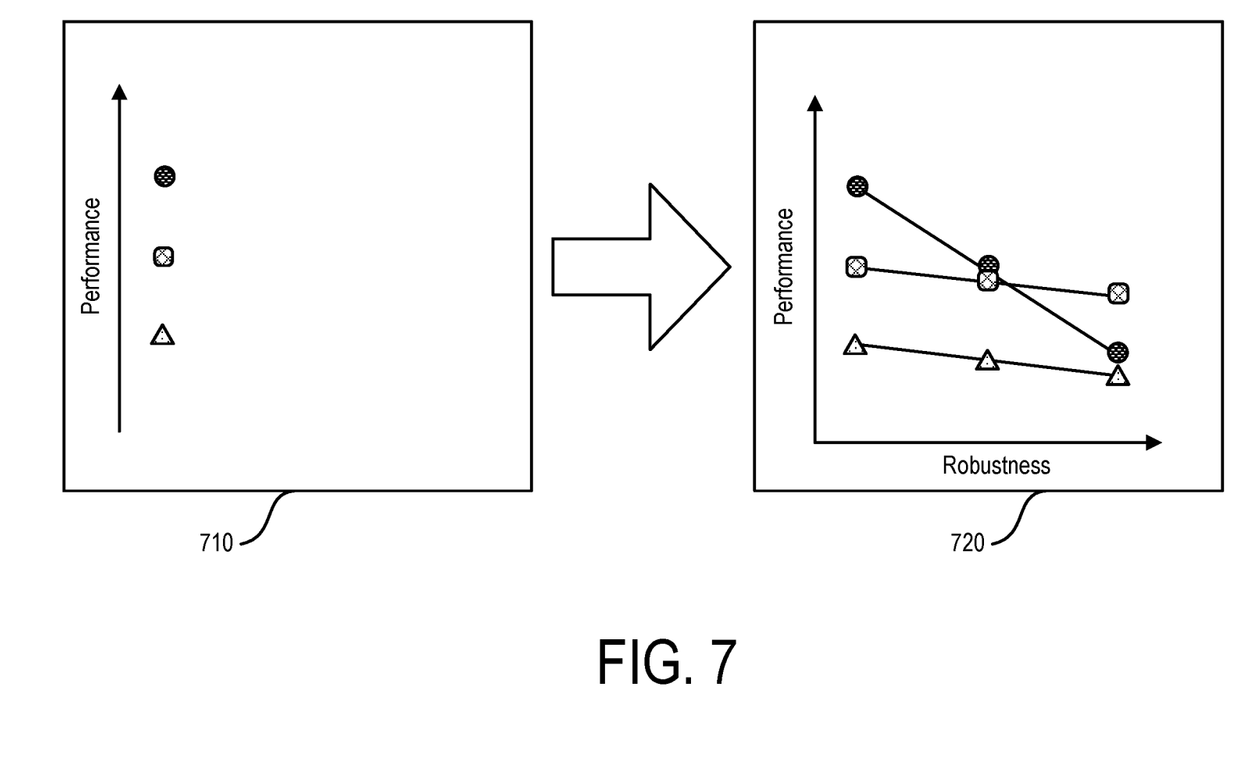
FIG. 7 is diagram illustrating a tradeoff between model performance and robustness using various assessment techniques.

By using the AIAVA engine 120, the data scientist can be provided with a more relevant information. For example, as provided in diagram 700 of FIG. 7, a data scientist may opt to adopt a certain model based on a single robustness level (as in 710). However, adversarial testing at different robustness levels demonstrate (as in 720) that a different model would be more appropriate based on the security or safety environment in which the model is operating. Robustness can be captured using a variety of metrics that evaluate the degradation and response to a model's output as a function of the amount of perturbation that is introduced on the input. This term as used herein is closely related to the notion of bounded input—bounded output, stability, and smoothness. It means that small changes to the input (e.g. imperceptible pixel modifications or empty byte sequences in compiled code, etc.) should not dramatically change the output generated by the model.

In another example, the AIAVA tool can be used to test a model's susceptibility to physical digital attacks. In particular, the AIAVA tool can be used to automatically create physical-to-digital adversarial samples. Using the same mechanisms listed above, and with reference to diagram 800 of FIG. 8, the digital evasive samples (i.e., images) which successfully evaded the machine learning-enabled computer vision classifier (as determined by the AIAVA engine 120) can be stored in a library of adversarial samples 810. Analytics on top of these images can be performed to understand critical levels of similarity.

Figure 8:
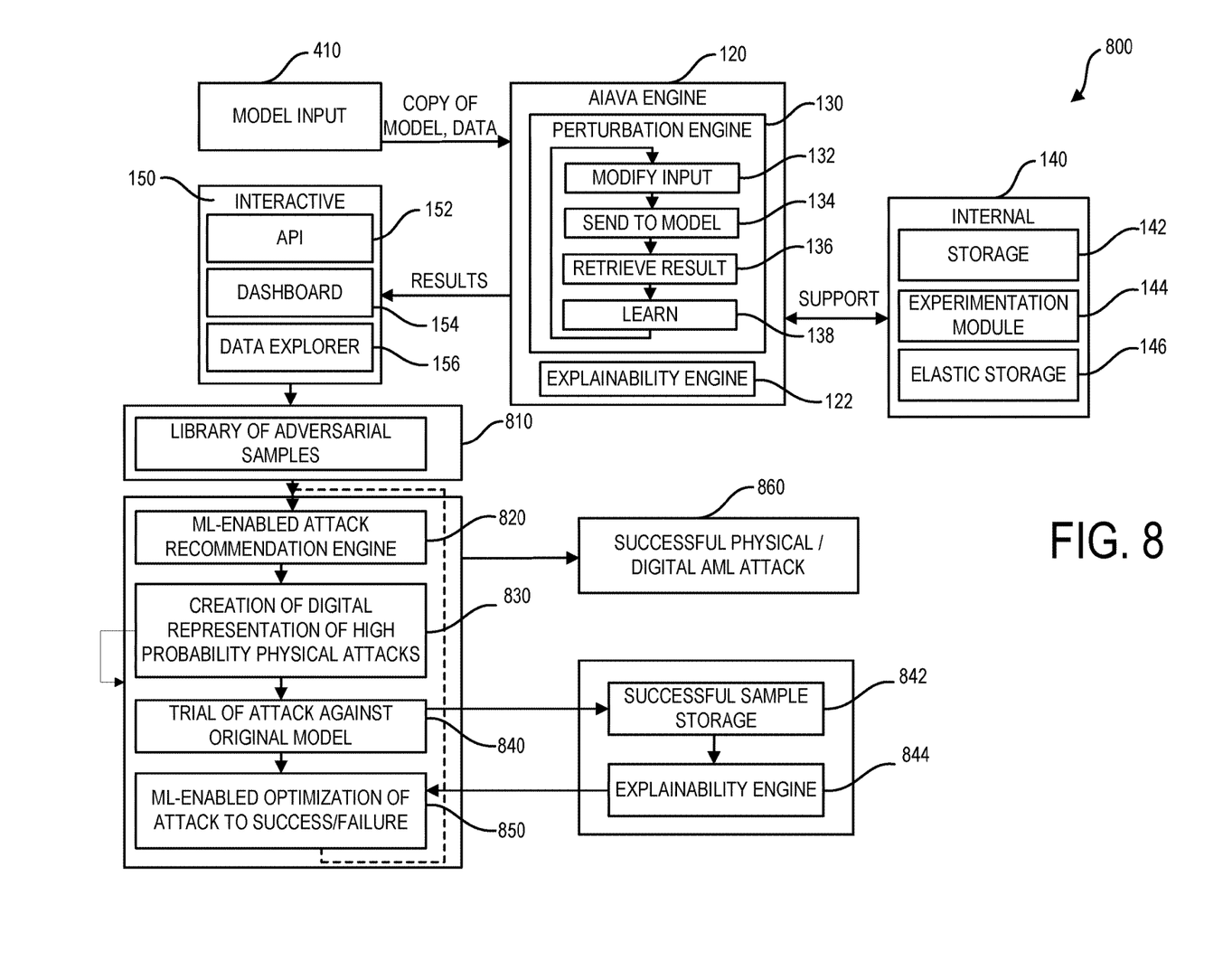
FIG. 8 is a diagram illustrating a second variation of the AIAVA tool of FIG. 1.

Thereafter, a machine-learning based attack recommendation engine 120 can recommends physical perturbations of the environment based on a library of successful attacks. These reconditions can be digitally rendered at 830 and tested at 840 against the original, unhardened computer vision model. Examples of successful attacks from this system include: environmental condition rendering include rain, snow, and sleet, sensor package angle misconfiguration, stickers on road signs to create a "targeted" attack (misclassification into a known separate entity instead of broad failure, etc.) and eyewear and clothing that fool facial recognition systems. Samples that were deemed to be successful can be stored 842 for further analysis by an additional explainability engine 844. This explainability engine 844 can provide operational explainability. For example, the explainability engine 844 can predict what actual changes to the image will cause misclassification. Such information is important to users as it allows for making predictions about the type of physical change that would cause misclassifications to occur.

At 850, each trial is captured and optimized and fed back into the library for further testing. Once a high confidence interval is reached (as defined by the user), at 860, a final physical evasive sample can be generated.

Figure 9:
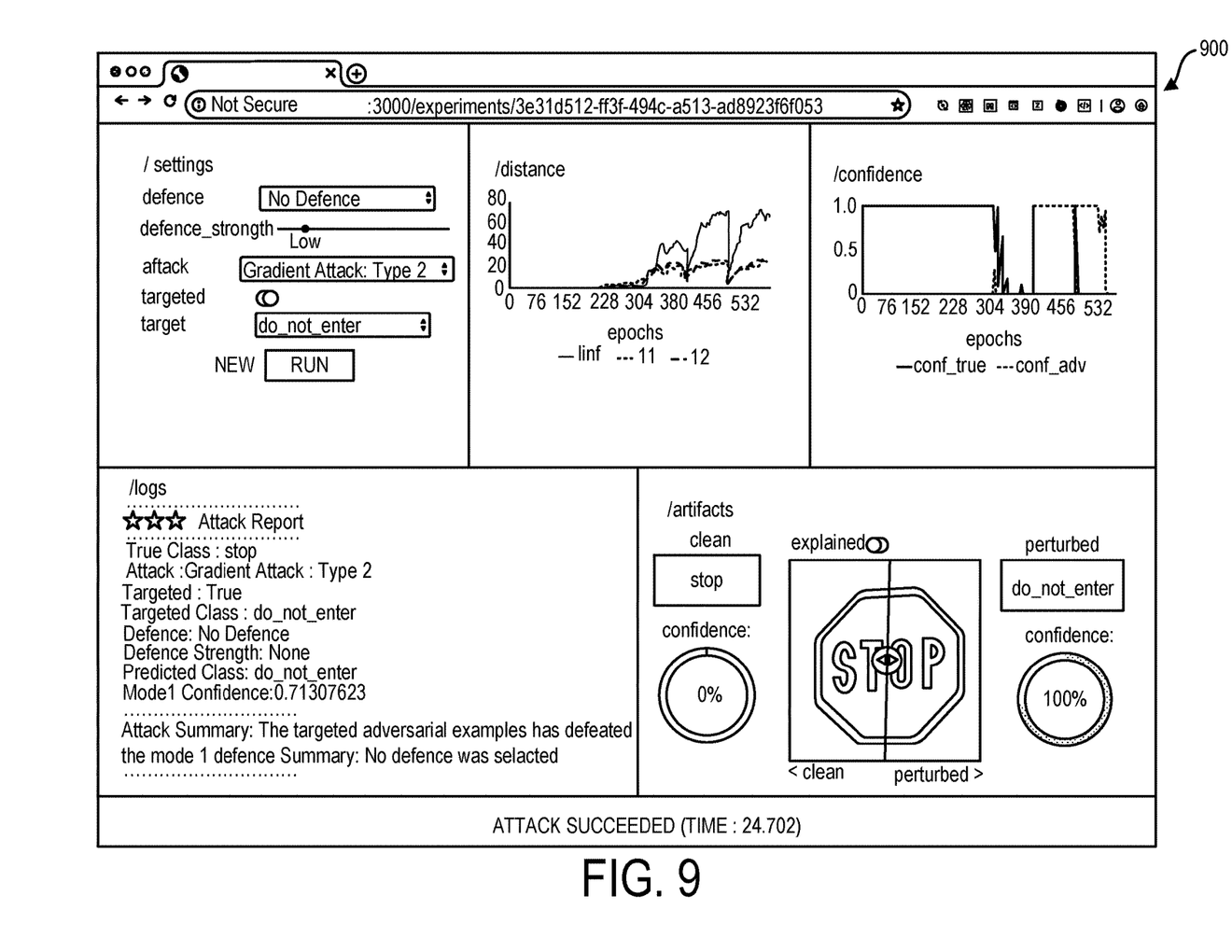
FIG. 9 is a diagram illustrating a first dashboard view.

The dashboard 154 can be configured to be as lightweight as possible while giving the user significant information. FIG. 9 is a diagram 900 of an example view relating to the creation of a targeted attack on a Stop Sign to confuse a self-driving car that it is in fact a Do Not Enter sign. As illustrated in the data below, although the attack is highly successful (the model has 71% confidence that the Stop Sign is Do Not Enter), the corresponding changes are invisible to the naked eye.

Figure 10:
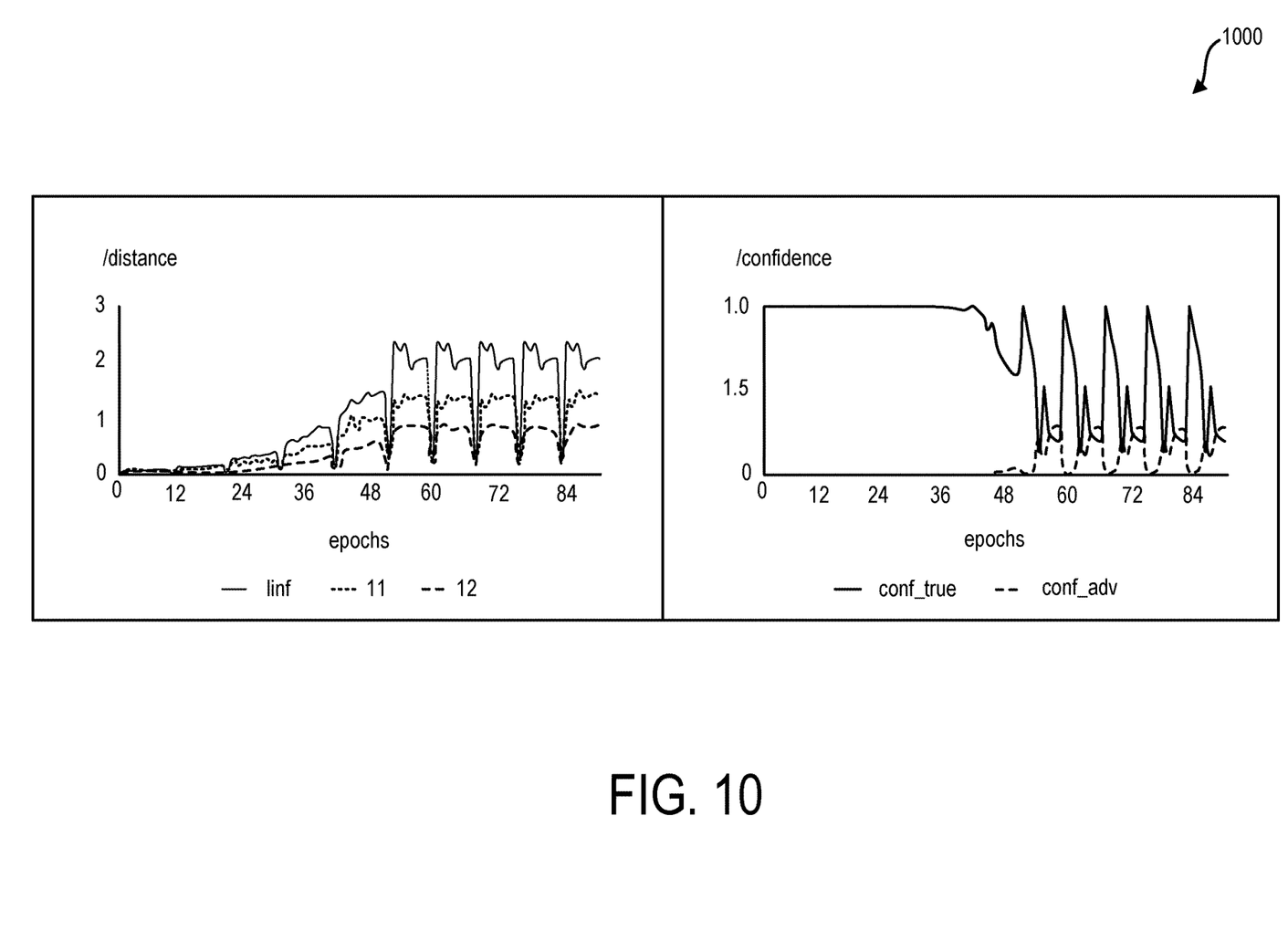
FIG. 10 is a diagram illustrating a second dashboard view.

The AIAVA engine 120 works through iterations know as Epochs as it optimizes the attack, with new trials being easily visible to the user through the peaks and troughs of the testing information series. Further views in the dashboard 154 relating to the epochs is illustrated in diagram 1000 of FIG. 10.

Figure 11:
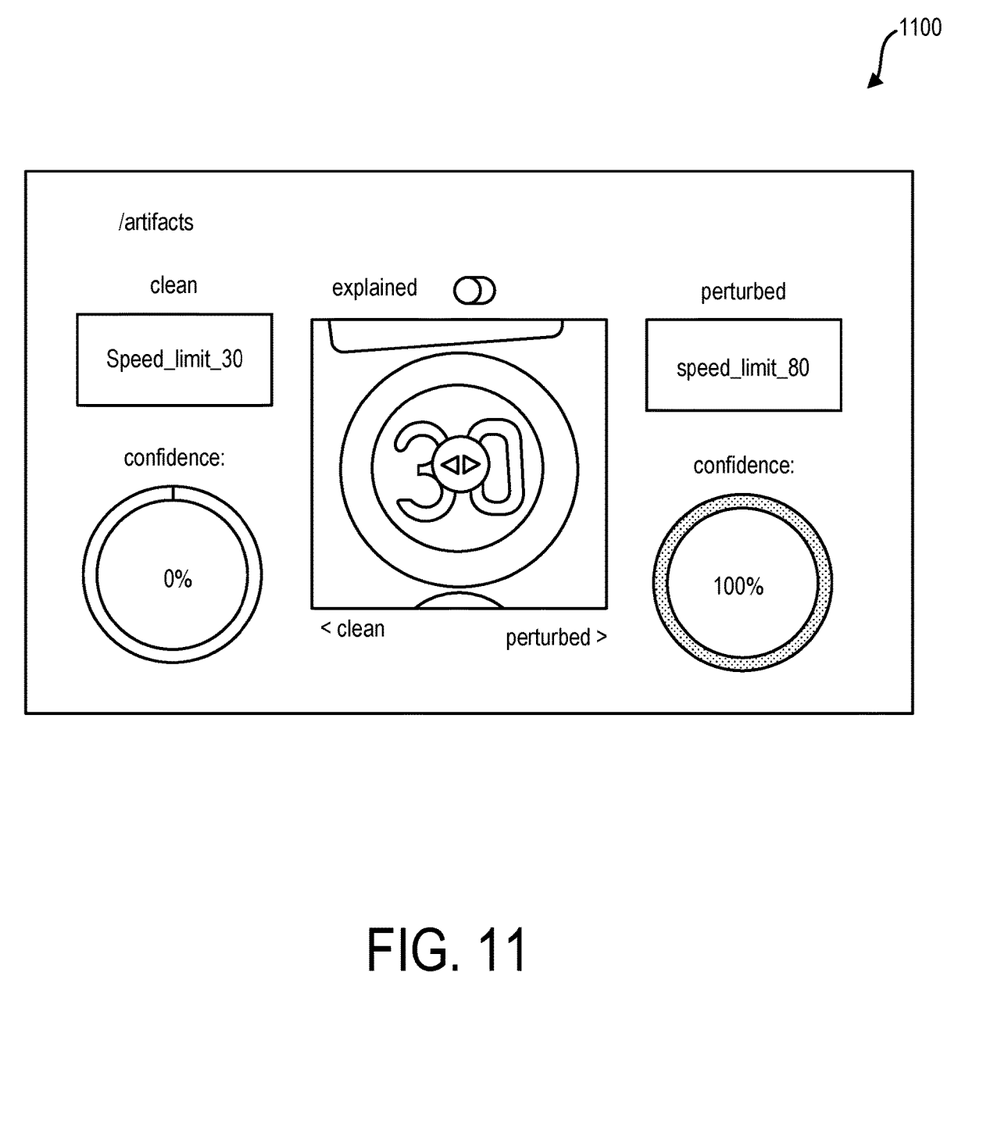
FIG. 11 is a diagram illustrating a visualization of how an image was modified to cause a machine learning model to inaccurately classify the modified image.

Physical attacks can be rendered from the AIAVA rendering engine 120 based on recommendations informed by the computer vision system. Factors that can be taken into account include data type, use case, sensor package position, collection tempo/frequency, and additionally the corresponding security environment. FIG. 11 is a diagram 1110 of a rendering of a sticker which when applied to physical road sign, can change, from the view of the model being tested, a 30-mph sign into a 80 mph sign. Such an example can also be rendered based on environmental elements such as precipitation or branch coverings of the sign.

Figure 12:
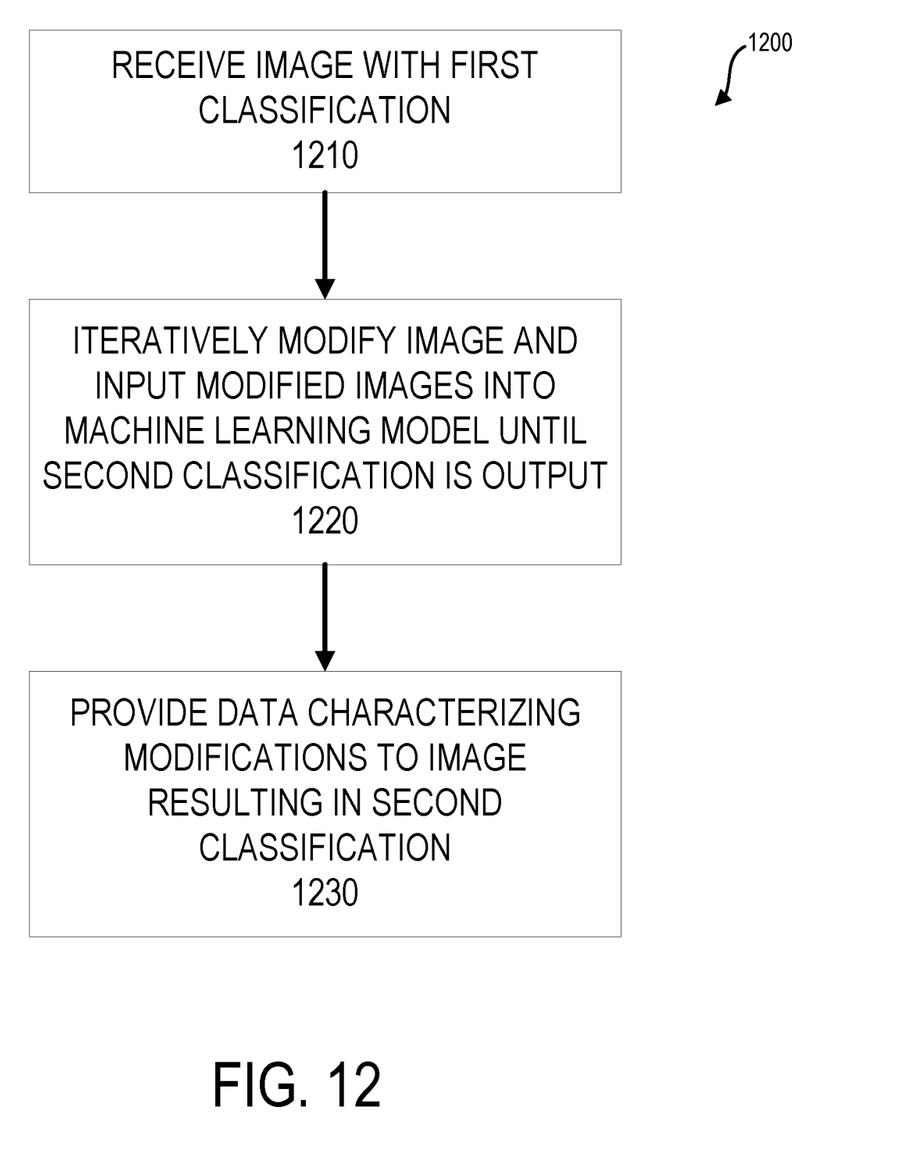
FIG. 12 is a process flow diagram illustrating assessment of the vulnerability of a machine learning model.

FIG. 12 is a diagram 1200 illustrating a technique for characterizing a robustness of a computer-vision machine learning model in which, at 1210, an image is received with a known, first classification by the machine learning model. This image is then, at 1210, iteratively modified using at least one perturbation algorithm and such modifications are iteratively input into the machine learning model until such time that the machine learning model outputs a second classification different from the first classification. Data is then provided, at 1230, which characterizes the modifications to the image that resulted in the machine learning model outputting the second classification.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for characterizing the robustness of a computer-vision machine learning model comprising:

receiving an image with a known, first classification by the machine learning model;

iteratively (i) modifying the image using at least one perturbation algorithm, wherein the iterative modifying of the image simulates an attack on the machine learning model and wherein the attack simulates a modification of a physical object and (ii) inputting the corresponding modified image into the machine learning model until such time that the machine learning model outputs a second classification different from the first classification;

providing data characterizing the modifications to the image that results in the machine learning model outputting the second classification; and printing an overlay comprising the modifications, wherein the overlay is printed on a sticker which can be affixed to or positioned in relation to the physical object.

2. The method of claim 1, wherein the providing data comprises at least one of:

causing the data to be displayed in a graphical user interface, loading the data into memory, storing the data in physical persistence, or transmitting the data to a remote computing device.

3. The method of claim 1, wherein the provided data characterizing the modifications explains how the modifying caused the machine learning to change its classification from the first classification to the second classification.

4. The method of claim 1, wherein the at least one perturbation algorithm uses gradient-based optimization to determine how to modify the image.

5. The method of claim 1, wherein the at least one perturbation algorithm uses reinforcement learning to determine how to modify the image.

6. The method of claim 1, wherein the at least one perturbation algorithm uses a random selection algorithm to determine how to modify the image.

7. The method of claim 1, wherein the at least one perturbation algorithm uses a pattern matching algorithm to determine how to modify the image.

8. The method of claim 7, wherein the pattern matching uses an Apriori algorithm.

9. The method of claim 1, wherein the attack simulates a change in an environmental condition of a sensor obtaining the image.

10. The method of claim 1, wherein the attack simulates a change in a position of a sensor obtaining the image.

11. A system for characterizing the robustness of a computer-vision machine learning model comprising:
at least one data processor; and
memory storing instructions which, when executed by the at least one data processor, result in operations comprising:
receiving an image with a known, first classification by the machine learning model;
continually modifying the image using at least one perturbation algorithm wherein continually modifying of the image simulates an attack on the machine learning model and wherein the attack simulates a modification of a physical object and inputting the corresponding modified image into the machine learning model until such time that the machine learning model outputs a second classification different from the first classification;
providing data characterizing the modifications to the image that resulted in the machine learning model outputting the second classification; and
printing an overlay comprising the modifications, wherein the overlay is printed on a sticker which can be affixed to or positioned in relation to the physical object.

12. The system of claim 11, wherein the provided data characterizing the modifications explains how the modifying caused the machine learning to change its classification from the first classification to the second classification.

13. The system of claim 11, wherein the at least one perturbation algorithm uses two or more of gradient-based optimization, reinforcement learning to determine how to modify the image, a random selection algorithm or a pattern matching algorithm to determine how to modify the image.

14. A non-transitory computer program product storing instructions which, when executed by at least one computing device, implement operations comprising:
receiving an image with a known, first classification by the machine learning model;
iteratively modifying the image using at least two perturbation algorithms including an algorithm that simulates an attack on the machine learning model and wherein the attack simulates a modification of a physical object and inputting the corresponding modified image into the machine learning model until such time that the machine learning model outputs a desired, second classification different from the first classification;
providing data characterizing the modifications to the image that resulted in the machine learning model outputting the second classification; and
printing an overlay comprising the modifications, wherein the overlay is printed on a sticker which can be affixed to or positioned in relation to the physical object.

\* \* \* \* \*